United States Patent
Carter

(10) Patent No.: US 7,427,133 B2
(45) Date of Patent: Sep. 23, 2008

(54) EARPIECE-LESS EYEGLASS FRAME HAVING A REMOVABLE RETAINER STRAP

(76) Inventor: Troy L. Carter, 2526 Shoreline Dr., Abilene, TX (US) 79602

( * ) Notice: Subject to any disclaimer, the term of this patent is extended or adjusted under 35 U.S.C. 154(b) by 193 days.

(21) Appl. No.: 11/406,206

(22) Filed: Apr. 18, 2006

(65) Prior Publication Data

US 2007/0242214 A1 Oct. 18, 2007

(51) Int. Cl.
*G02C 3/00* (2006.01)
(52) U.S. Cl. .............. 351/156; 351/111; 351/158
(58) Field of Classification Search ............ 351/41, 351/111–122, 156–158
See application file for complete search history.

(56) References Cited

U.S. PATENT DOCUMENTS

| | | | |
|---|---|---|---|
| 3,533,687 A * | 10/1970 | Herzig ............ 351/121 |
| 4,153,347 A | 5/1979 | Myer |
| 4,471,509 A | 9/1984 | Marks |
| 5,032,018 A | 7/1991 | McCulley et al. |
| 5,313,671 A * | 5/1994 | Flory ............ 2/428 |
| 5,452,029 A * | 9/1995 | Yang ............ 351/140 |
| 5,628,092 A | 5/1997 | Harris et al. |
| 5,735,393 A | 4/1998 | Shiue et al. |
| 5,980,039 A | 11/1999 | Schmid et al. |
| D466,543 S | 12/2002 | Beames |
| 6,511,176 B2 | 1/2003 | Kliot |
| 6,764,177 B1 | 7/2004 | Chisolm |
| 6,908,194 B1 * | 6/2005 | Johnson ............ 351/156 |
| 6,941,619 B2 | 9/2005 | Mackay et al. |
| 2007/0236650 A1 * | 10/2007 | Jain ............ 351/41 |

* cited by examiner

*Primary Examiner*—Huy K Mai
(74) *Attorney, Agent, or Firm*—Steven W. Smith

(57) ABSTRACT

An earpiece-less lenticular eyeglass frame and removable retainer strap. Attachment mechanisms on each side of the lenticular frame enable a retainer strap to be directly connected to the frame. The retainer strap includes an end-piece at each end of the strap that is compatible with the two attachment mechanisms for attaching the strap to the frame and for removing the strap from the frame. A sliding clasp is used to adjust tension on the retainer strap for different activities such as reading or playing sports. A user may remove the retainer strap to interchange straps or to move the retainer strap from one pair of eyeglasses to another. The absence of earpieces makes the eyeglasses more comfortable, lightweight, less bulky, and less susceptible to damage.

11 Claims, 3 Drawing Sheets

EARPIECE-LESS EYEGLASS FRAME HAVING A REMOVABLE RETAINER STRAP

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to eyeglass frames. More particularly, and not by way of limitation, the present invention is directed to an earpiece-less eyeglass frame having a removable retainer strap.

Eyeglasses, including sunglasses, are held in place on a user's face with earpieces, also known as temple pieces. The earpieces connect to the side of the eyeglass lenticular frame and extend rearward along each temple to the user's ears. A rearmost portion of the earpieces may curve downward so that the earpieces curve around the ear and help hold the eyeglasses in place. The earpieces may also have spring tension that holds them securely to the user's temple, thereby helping to hold the eyeglasses in place.

It is known from the prior art to attach a retainer strap to the earpieces of a pair of eyeglasses. Short elastic straps may be utilized to hold the eyeglasses in place during physical activities such as various sporting events. Longer, generally non-elastic straps connected to the earpieces may be placed around a user's neck, so that the user can remove the eyeglasses from his face and let them hang by the retainer strap when not in use.

All of the above techniques for holding eyeglasses on a user's face suffer from various disadvantages associated with the earpieces. First, the earpieces are uncomfortable as they press against the user's head and ears. Second, the earpieces add unwanted weight to the eyeglasses. Third, the earpieces add bulk to the eyeglasses making them more difficult to store in a user's pocket or eyeglass holder. Fourth, the earpieces are easily bent, making it difficult to keep the eyeglasses in a level position on the user's face. Fifth, earpieces are often made of various metallic and composite compounds, and being in firm contact with the temple skin of the face and around the skin of the ear, can often cause allergic skin reactions. Finally, the hinges that connect the earpieces to the frame are often fragile and easily break, thereby rendering the eyeglasses useless.

A known solution to this problem has been utilized with sunglasses in an opthalmologist's eye care center. The sunglasses were provided to patients who had had their eyes dilated during various procedures in the eye care center. An earpiece retainer pin was removed from the frame of the sunglasses, and the earpieces were removed. The pin was pierced through a retainer strap and was then replaced in the frame, thereby permanently attaching the retainer strap to the eyeglass rim.

Although this solved the problem of uncomfortable earpieces, it did not provide the user with the ability to interchange retainer straps or move a retainer strap from one pair of eyeglasses to another.

What is needed in the art is an eyeglass frame that overcomes the shortcomings of the prior art. The present invention provides such an eyeglass frame.

BRIEF SUMMARY OF THE INVENTION

The present invention provides an earpiece-less eyeglass frame having a removable retainer strap. The absence of earpieces makes the eyeglasses more comfortable, lightweight, less bulky, and less susceptible to damage. The user can interchange retainer straps or move a retainer strap from one pair of eyeglasses to another.

Thus, in one aspect, the present invention is directed to an earpiece-less eyeglass apparatus. The apparatus includes a lenticular frame for holding at least one eyeglass lens, and first and second attachment mechanisms on each side of the lenticular frame for removably attaching a retainer strap directly to the frame. The apparatus may also include a retainer strap for retaining the lenticular frame on a user's face by placing the strap behind the user's head. The retainer strap includes an end-piece at each end of the strap that is compatible with the first and second attachment mechanisms to attach the strap to the frame and to remove the strap from the frame.

In another aspect, the present invention is directed to a retainer strap for retaining a lenticular eyeglass frame on a user's face by placing the strap behind the user's head. The eyeglass frame includes a first attachment mechanism on a first side of the frame and a second attachment mechanism on a second side of the frame. The retainer strap includes a first end-piece at a first end of the retainer strap and a second end-piece at a second end of the retainer strap. The first and second end-pieces are compatible with the first and second attachment mechanisms to attach the strap directly to the frame and to remove the strap from the frame.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention provides an earpiece-less eyeglass frame having a removable retainer strap. A user may remove the retainer strap and replace it with an interchangeable strap of a different style or color. This may be done for fashion purposes or because the user is about to engage in a different activity. For example, the user may remove a long strap used in his office and replace it with a shorter elastic strap used for sports. Alternatively, the user may be moving from indoors to outdoors, and may remove a strap from a pair of eyeglasses such as reading glasses and attach the strap to a pair of sunglasses. Use of a strap instead of earpieces enables the user to remove the eyeglasses from the eyes and dangle them by the strap on the user's chest, rotate them to the back of the neck, or place them onto the crown of the head, all while eliminating the discomfort of earpieces.

Figure 1:
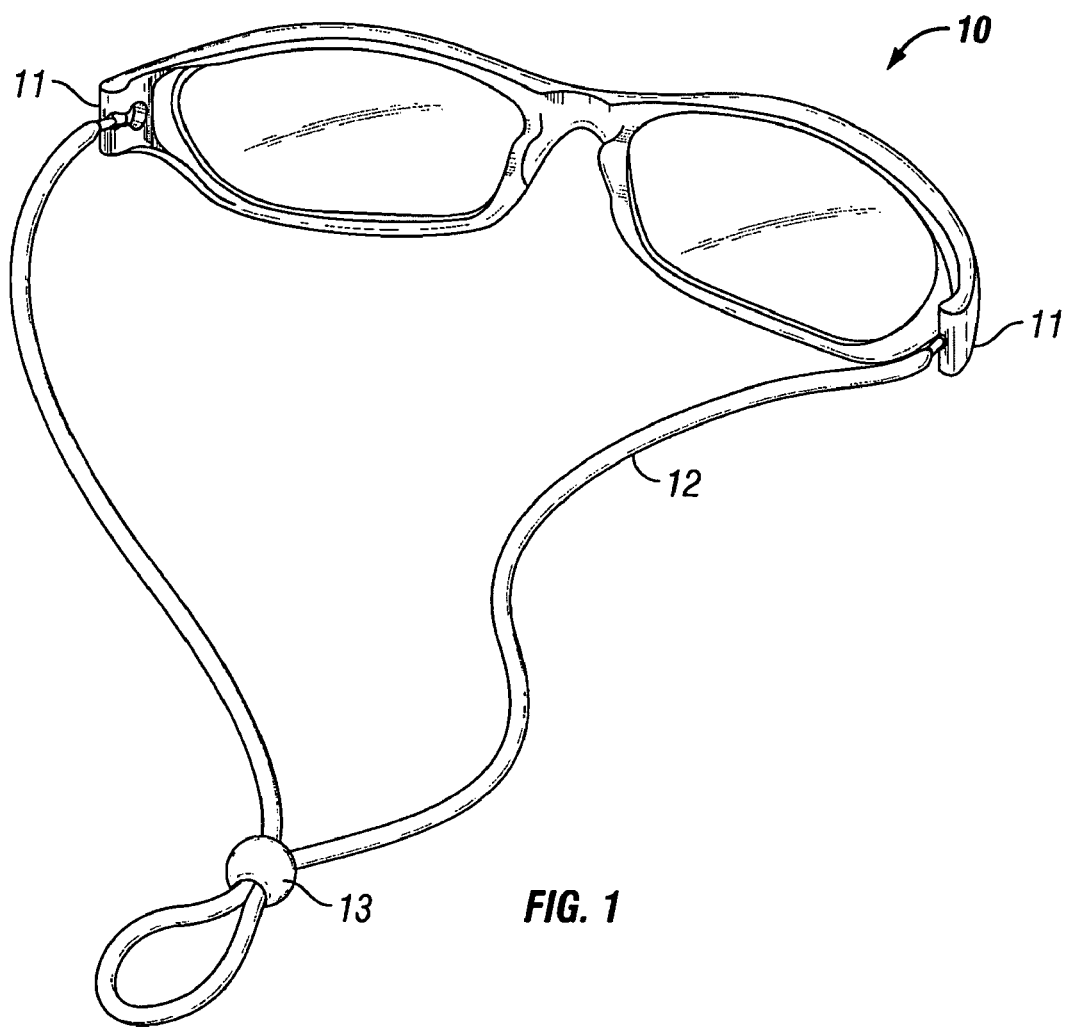
FIG. 1 is a backside perspective view of an embodiment of the eyeglass frame of the present invention.

FIG. 1 is a backside perspective view of an embodiment of the eyeglass frame 10 of the present invention. The frame may be utilized for wearing and storing eyeglasses, sunglasses, safety glasses, sports glasses, and/or reading glasses. The frame includes a lenticular portion for holding the lenses and an attachment mechanism 11 on each side for removably attaching a retainer strap 12. In the embodiment illustrated in FIG. 1, the attachment mechanism is a ball-and-socket hinge mechanism, which allows for increased movement of the front end of the strap in relation to the frame. The ball-and-socket hinge mechanism is shown in more detail in FIGS. 2 and 3.

The absence of hard plastic, composite, or metal earpieces provides freedom from ear tension, weight, and allergic reactions to plastic or metallic materials by the user. In use, the eyeglass frame 10 is held in place on the user's face by the retainer strap 12. The strap may be placed over the ears and then adjusted for tension with a sliding clasp or bead 13. The sliding clasp may isolate a portion of the strap, thereby providing a strap with a shorter effective length. The strap may be made of any suitable material such as, for example, elastic, cloth, leather, rope, flexible composites, chain, or other narrow cloth-like plastic, or metallic material in a strap configuration.

The clasp 13 may also be a spring-loaded clasp, which allows for tightening the strap against the back of the head, thus retaining the eyeglasses more securely to the nose and face without earpieces. The tension can be adjusted in order to accommodate wearing needs such as a tighter fit for increased wind conditions or high activity levels (sporting activities), or reduced tightness for reading. The tightening clasp may also be designed to appear as a piece of decorative jewelry. In this case, the clasp may be rotated to the front of the body thus placing the eyeglasses behind the neck when not in use. The clasp may also have a mass sufficient to provide a counterweight to the eyeglasses even when no tension is placed on the strap. For most activities, however, the friction of the strap 12 against the side of the head and the top of the ears is sufficient to retain the eyeglasses in place.

Figure 2:
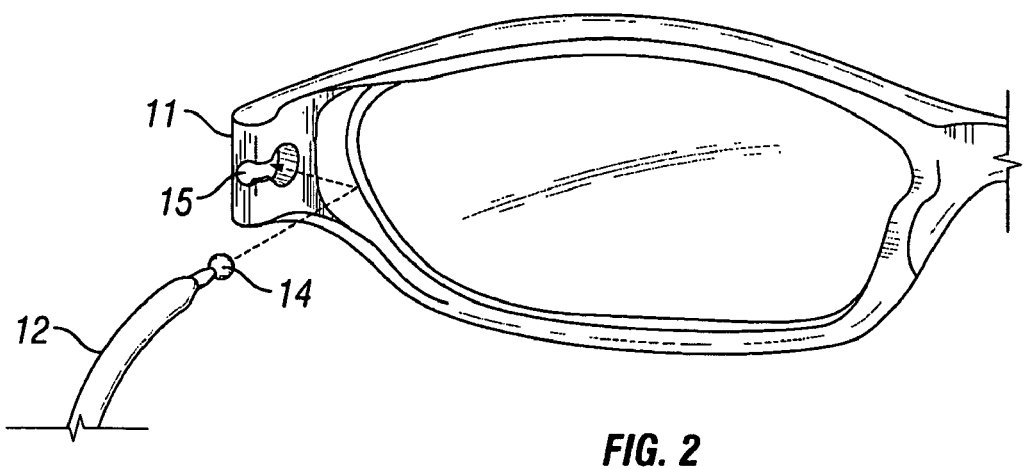
FIG. 2 is a more detailed view of a ball-and-socket attachment mechanism with the strap removed.

FIG. 2 is a more detailed view of the ball-and-socket attachment mechanism 11 with the strap 12 removed. The strap, with attached ball-piece 14, is directly and firmly attached to the socket 15 in the frame by snapping the ball-piece into the socket, which is located in the frame temple area. The construction material of the ball and socket joint depends on the frame material, but may be, for example, plastic, metal, composite material, or the like.

Figure 3A:
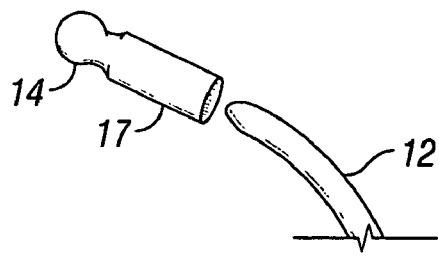
FIGS. 3A and 3B illustrate two exemplary embodiments of a ball-piece connector.
Figure 3B:
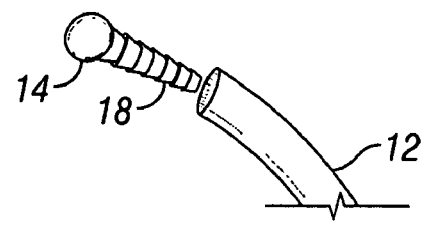

FIGS. 3A and 3B illustrate two exemplary embodiments of a ball-piece connector. In FIG. 3A, the ball-piece 14 is connected to a sleeve 17, which slides over the tip of the strap 12. The strap may be glued inside the sleeve. The sleeve may be rigid or flexible. This embodiment is used when the strap is constructed of a solid material such as leather. In FIG. 3B, the ball-piece is connected to a solid shaft 18, which slides into a hollow, tubular strap. Such tubular straps are known, and are designed to fit over the earpieces of standard eyeglasses. The post may be tapered to facilitate placing it in the end of the tubular strap. The post may be glued inside the tubular strap. Ridges or threads may also be made on the shaft to help retain the shaft in the strap.

Figure 4A:
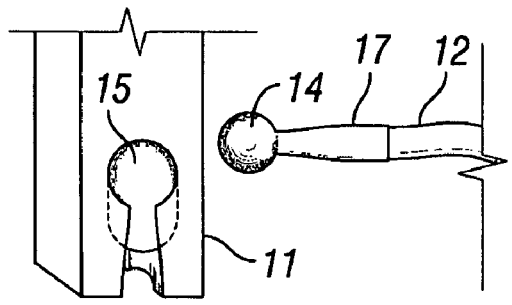
FIGS. 4A-4D illustrate an exemplary sequence of placing a ball-piece connector into a socket and locking it into place.
Figure 4B:
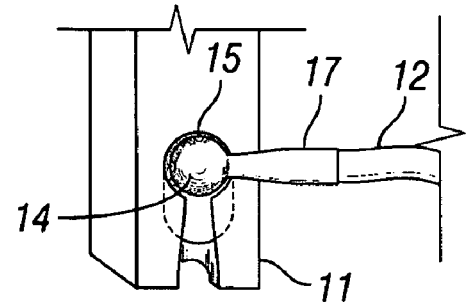
Figure 4C:
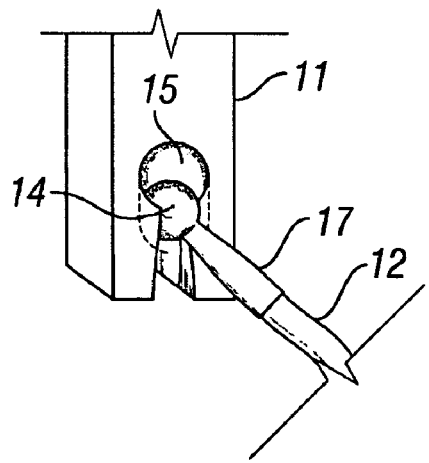
Figure 4D:
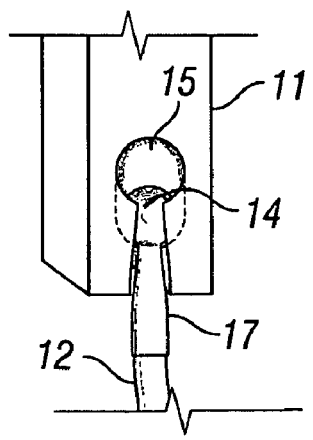

FIGS. 4A-4D illustrate an exemplary sequence of placing the ball-piece 14 into the socket 15 and locking it into place. In FIG. 4A, the ball-piece is brought into alignment with the socket 15 within the attachment mechanism 11. The sleeve 17 is preferably rigid in this embodiment. In FIG. 4B, the ball-piece is placed into the socket, with the rigid sleeve outside the socket approximately perpendicular to the surface of the attachment mechanism. In FIG. 4C, the user utilizes the rigid sleeve to push the ball-piece into a recessed position inside the attachment mechanism. The sleeve is also rotated toward a locked position. In FIG. 4D, the narrow neck of the sleeve has snapped through the narrow part of the socket and is secured in the locked position. To remove the strap from the eyeglass frame, the user merely reverses the process.

Figure 5:
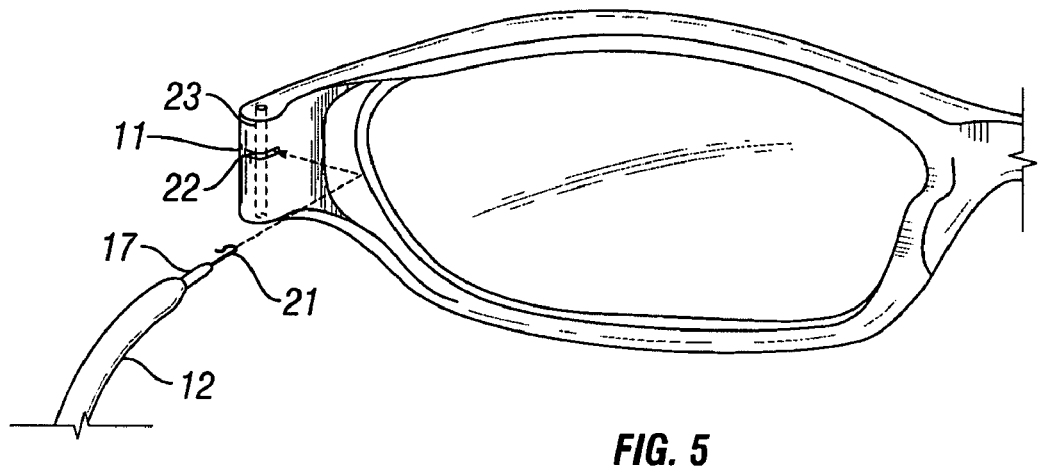
FIG. 5 is a backside perspective view of an alternative embodiment of a strap attachment mechanism.

FIG. 5 is a backside perspective view of an alternative embodiment of the strap attachment mechanism 11. In this embodiment, instead of a ball-and-socket attachment mechanism, the invention utilizes a hook-and-rod attachment mechanism. A hooked pin 21, similar to a cotter pin, is attached to the sleeve 17. To attach the strap to the eyeglass frame, the pin is inserted in a slot 22 so that the gap formed at the curved end of the pin is aligned with a rod 23. The user then pulls the pin rearward until the narrow portion of the pin's gap snaps over the rod. The pin is then secured in the locked position. To remove the strap from the eyeglass frame, the user pushes the pin 21 until it snaps over the rod 23 in the opposite direction, thus freeing the pin to be removed from the slot 22.

Alternatively, the attachment mechanism 11 may be equipped with a slot 22 just wide enough to accept the widest portion of the curved pin 21. In this embodiment, the rod 23 may be offset from the center of the slot 22 so that the widest portion of the curved pin 21 snaps over the rod as the pin is inserted into the slot. To remove the strap 12, the user simply pulls the strap with enough force to cause the rod to compress the widest portion of the pin enough to slip past the rod and exit the slot.

In other alternative embodiments, the strap 12 may be equipped with other types of connection devices for connecting to the attachment mechanism 11 and disconnecting from the attachment mechanism. For example, the connection device and the attachment mechanism may for the two components of a standard clothing snap by which the strap may be snapped to the eyeglass frame. Alternatively, the connection device may comprise a swivel joint and a screw, and the attachment mechanism may comprise a threaded screw hole. This embodiment enables the strap to be screwed to the eyeglass frame.

In yet another embodiment, the connection device attached to the end of the strap 12 may comprise a strip of hook-and-loop material. The hook-and-loop material is oriented so that the strip can be folded back and attached to itself, forming a loop of material. The attachment mechanism 11 includes a small C-shaped extension through which the strip of hook-and-loop material is passed. The hook-and-loop material is then folded back and attached to itself, connecting the strap to the eyeglass frame. To remove the strap, the user separates the hook-and-loop material and slides the strip out of the C-shaped extension in the attachment mechanism.

The earpiece-less eyeglass frame of the present invention provides increased comfort, reduced eyeglass weight, and less strain on the temples of the head and around and behind the ears. Without the bulky earpieces, the lens portion of the eyeglasses rides more compressed against the body when the eyeglasses are removed and hung around the neck by the strap. This provides for increased ease of movement and less obtrusion to clothing or while hugging. If the glasses are worn around the neck when not in use, there is less likelihood of their being lost, which is of added benefit to children. Without the earpieces, the straps can be easily wrapped around the bridge piece of the eyeglasses and they may then be placed in a pants pocket without as much bulk or the threat of bending or breaking the earpieces, or breaking the earpiece hinge. A cloth strap an/or interchangeable straps of other materials also solve the problem of users who have allergic reactions to the metallic and composite compounds from which earpieces are made. The user can switch to a strap constructed of a material that does not cause the individual an allergic reaction.

The strap 12, being removable, can also be interchanged easily with straps of other colors, designs, and/or materials as long as the straps have an end-piece compatible with the attachment mechanism 11. This enables the user to customize the eyeglasses for different fashion needs. Worn out straps can also be easily replaced without necessitating replacement of the entire eyeglass frame.

Additionally, since a strap affixed directly to the eyeglass frame is necessarily in contact with the side and back of the head and neck, the strap may become soiled with sweat, dirt, skin oils, perfumes, and other bodily contaminants. The removable strap of the present invention enables the user to remove the strap for cleaning in a washing machine or other disinfecting device without ruining the frames, lenses, or special coatings on lens surfaces.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. An earpiece-less eyeglass apparatus, comprising:
   a lenticular frame for holding at least one eyeglass lens;
   first and second attachment mechanisms on each side of the lenticular frame for removably attaching a retainer strap directly to the frame;
   a retainer strap for retaining the lenticular frame on a user's face by placing the strap behind the user's head, said retainer strap having an end-piece at each end of the strap, said end-piece being compatible with the first and second attachment mechanisms to attach the strap to the frame and to remove the strap from the frame; and
   an adjustment mechanism for adjusting the retainer strap to provide greater or lesser tension on the frame, said adjustment mechanism including a slidable clasp for isolating a portion of the retainer strap thereby providing a retainer strap with a shorter effective length, wherein the slidable clasp has a mass sufficient to provide a counter-weight to the lenticular frame.

2. The earpiece-less eyeglass apparatus according to claim 1, wherein:
   the first and second attachment mechanisms include a slot having a rod mounted therein; and
   the end-pieces of the retainer strap include a curved pin connector shaped to securely snap over the rod within the slot.

3. The earpiece-less eyeglass apparatus according to claim 1, wherein the slidable clasp includes a piece of decorative jewelry.

4. The earpiece-less eyeglass apparatus according to claim 1, wherein the slidable clasp includes a spring to hold the clasp in place at a location on the retainer strap selected by the user.

5. The earpiece-less eyeglass apparatus according to claim 1, wherein the retainer strap is constructed of an elastic material.

6. The earpiece-less eyeglass apparatus according to claim 1, wherein the retainer strap is constructed of a non-elastic material.

7. A retainer strap for retaining a lenticular eyeglass frame on a user's face by placing the strap behind the user's head, said eyeglass frame having a first attachment mechanism on a first side of the frame and a second attachment mechanism on a second side of the frame, said retainer strap comprising:
   a first end-piece at a first end of the retainer strap, said first end-piece being compatible with the first attachment mechanism to attach the strap directly to the frame and to remove the strap from the frame:
   a second end-piece at a second end of the retainer strap, said second end-piece being compatible with the second attachment mechanism to attach the strap directly to the frame and to remove the strap from the frame; and
   an adjustment mechanism for adjusting the retainer strap to provide greater or lesser tension on the frame, said adjustment mechanism including a slidable clasp for isolating a portion of the retainer strap thereby providing a retainer strap with a shorter effective length, wherein the slidable clasp has a mass sufficient to provide a counter-weight to the lenticular frame.

8. The retainer strap according to claim 7, wherein the first and second end-pieces are identical.

9. The retainer strap according to claim 8, wherein the first and second attachment mechanisms on the frame include a slot having a rod mounted therein, and the end-pieces of the retainer strap include a curved pin connector shaped to securely snap over the rod within the slot on the frame.

10. The retainer strap according to claim 7, wherein the slidable clasp includes a piece of decorative jewelry.

11. The retainer strap according to claim 7, wherein the slidable clasp includes a spring to hold the clasp in place at a location on the retainer strap selected by the user.

* * * * *